(12) United States Patent
Tibbetts et al.

(10) Patent No.: US 11,371,385 B2
(45) Date of Patent: Jun. 28, 2022

(54) MACHINE FOAM CLEANING SYSTEM WITH INTEGRATED SENSING

(71) Applicant: General Electric Company, Schenectady, NY (US)

(72) Inventors: Nicole Jessica Tibbetts, Delanson, NY (US); Bernard Patrick Bewlay, Niskayuna, NY (US); Michael Eriksen, Cincinnati, OH (US); Keith Anthony Lauria, Wells, NY (US); Richard Schliem, Grand Rapids, MI (US); Erica Sampson, Scotia, NY (US); Eric Telfeyan, Delanson, NY (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 15/957,572

(22) Filed: Apr. 19, 2018

(65) Prior Publication Data

US 2019/0323378 A1 Oct. 24, 2019

(51) Int. Cl.
*F01D 25/00* (2006.01)
*B08B 9/00* (2006.01)
*B08B 3/00* (2006.01)

(52) U.S. Cl.
CPC .............. *F01D 25/002* (2013.01); *B08B 9/00* (2013.01); *B08B 3/003* (2013.01)

(58) Field of Classification Search
CPC .................................................... F01D 25/002
See application file for complete search history.

(56) References Cited

U.S. PATENT DOCUMENTS

| 4,917,123 A * | 4/1990 | McConnell | ............. B05C 3/109 |
| | | | 134/100.1 |
| 5,137,694 A | 8/1992 | Copeland et al. | |

(Continued)

FOREIGN PATENT DOCUMENTS

| CA | 2763088 A1 | 12/2005 |
| CA | 3024408 A1 | 12/2017 |

(Continued)

OTHER PUBLICATIONS

Cole-Parmer "Hach 5870029 Pocket Colorimeter Ii" https://www.coleparmer.com/...UX&persist=true&ip=no&gclid=EAIaIQobChMI_uKv9d3p2QIVCSu9Ch11xg_UEAQYAiABEgLfGPD_BwE (5 pages).

(Continued)

*Primary Examiner* — Mikhail Kornakov
*Assistant Examiner* — Pradhuman Parihar
(74) *Attorney, Agent, or Firm* — Fitch, Even, Tabin & Flannery LLP

(57) ABSTRACT

A machine is cleaned by directing a foam detergent into the machine to remove contaminants from inside the machine. An effluent portion of the foam detergent exits from the machine with some of the contaminants. One or more of a turbidity, a salinity, an amount of total dissolved solids, or a concentration the contaminants in the effluent is measured. A cleaning time period during which the foam detergent is to be directed into the machine is determined based on the turbidity, the salinity, the amount of total dissolved solids, and/or the contaminant concentration that is measured from the effluent. The foam detergent continues to be directed into the machine during the cleaning time period, and the flow of the foam detergent into the machine is terminated on expiration of the time period.

7 Claims, 4 Drawing Sheets

(56) References Cited

U.S. PATENT DOCUMENTS

| | | | |
|---|---|---|---|
| 6,423,280 B1 | 7/2002 | Tarara et al. | |
| 6,478,033 B1* | 11/2002 | Foster | C11D 3/0073 134/22.1 |
| 7,033,979 B2 | 4/2006 | Herwig et al. | |
| 7,297,260 B2 | 11/2007 | Hjerpe et al. | |
| 7,444,842 B2 | 11/2008 | Kim et al. | |
| 8,028,936 B2 | 10/2011 | McDermott | |
| 8,197,609 B2 | 6/2012 | Alvestig et al. | |
| 8,273,184 B2 | 9/2012 | Wagner | |
| 8,277,647 B2 | 10/2012 | Rice et al. | |
| 8,510,887 B2 | 8/2013 | Hasse et al. | |
| 8,628,627 B2 | 1/2014 | Sales et al. | |
| 9,138,782 B2 | 9/2015 | Dorshimer et al. | |
| 9,506,184 B2 | 11/2016 | Kim et al. | |
| 9,739,168 B2 | 8/2017 | Ekanayake et al. | |
| 10,634,004 B2 | 4/2020 | Giljohann et al. | |
| 10,669,885 B2 | 6/2020 | Pecchiol et al. | |
| 10,920,181 B2 | 2/2021 | Martin et al. | |
| 2006/0219269 A1* | 10/2006 | Rice | B08B 3/02 134/169 R |
| 2007/0118271 A1 | 5/2007 | Wiseman et al. | |
| 2008/0087300 A1 | 4/2008 | Kohler | |
| 2008/0173330 A1 | 7/2008 | Wagner | |
| 2008/0178909 A1* | 7/2008 | Alvestig | B08B 3/02 134/18 |
| 2009/0260660 A1 | 10/2009 | Asplund et al. | |
| 2010/0102835 A1 | 4/2010 | Chillar et al. | |
| 2010/0116292 A1 | 5/2010 | Wagner | |
| 2013/0074879 A1 | 3/2013 | Battaglioli et al. | |
| 2013/0104934 A1 | 5/2013 | Tadayon | |
| 2013/0283812 A1 | 10/2013 | Dutta et al. | |
| 2014/0251392 A9 | 9/2014 | Alvestig et al. | |
| 2015/0159122 A1 | 6/2015 | Tibbetts et al. | |
| 2015/0307212 A1* | 10/2015 | Petter | B64F 5/30 134/10 |
| 2015/0315350 A1 | 11/2015 | Mao et al. | |
| 2015/0353871 A1 | 12/2015 | Oebro et al. | |
| 2016/0024438 A1 | 1/2016 | Tibbetts et al. | |
| 2016/0045841 A1 | 2/2016 | Kaplan et al. | |
| 2016/0160679 A1 | 6/2016 | Griffiths et al. | |
| 2016/0230592 A1* | 8/2016 | Saenz | B01F 13/0035 |
| 2017/0145669 A1* | 5/2017 | Klicpera | E03C 1/00 |
| 2017/0159221 A1 | 6/2017 | Cho et al. | |
| 2017/0167290 A1 | 6/2017 | Kulkarni et al. | |
| 2018/0002858 A1 | 1/2018 | Hombroek et al. | |
| 2018/0010982 A1* | 1/2018 | Dauenhauer | F01D 25/002 |
| 2019/0144136 A1 | 5/2019 | Sachdeva et al. | |
| 2021/0108537 A1 | 4/2021 | Rigg et al. | |
| 2021/0317752 A1 | 10/2021 | Deja et al. | |

FOREIGN PATENT DOCUMENTS

| | | | | |
|---|---|---|---|---|
| DE | 102013202616 B4 | 10/2015 | | |
| DE | 102015006330 B4 | 8/2019 | | |
| EP | 1914010 B1 | 1/2008 | | |
| EP | 2180146 A2 | 10/2008 | | |
| EP | 2180146 A2 | 4/2010 | | |
| EP | 2243562 A1 | 10/2010 | | |
| EP | 2876263 A1 | 5/2015 | | |
| WO | WO-2018004873 A1 * | 1/2018 | | B64F 5/60 |
| WO | 2020022474 A1 | 1/2020 | | |
| WO | 2020030516 A1 | 2/2020 | | |

OTHER PUBLICATIONS

Fondriest Environmental Inc., "Measuring Turbidity, TSS, and Water Clarity", Webpage, Sep. 5, 2014 <http://www.fondriest.com/environmental-measurements/equipment/measuring-water-quality/turbidity-sensors-meters-and-methods/> (14 pages).

Hatch, "Sulfate", DOC316.53.01316, https://www.hach.com/asset-get.download.jsa?id=9595814106.

Hatch, "Sulfite Test Kit, Model SU-5" Hach USA—Overview https://www.hach.com/sulfite-test-kit-model-su-5/product?id=7640219 (2 pages).

Lufthansa Technik "Cyclean Engine Wash", https://www.lufthansa-technik.com/cyclean, 2017 (2 pages).

Mettler Toledo "Day-to-Day Measurement Practice", Mettler-Toledo AG, Analytical, Switzerland, 2013, (32 pages).

Robb, "Compressor Washing Keeps Gas Turbines Running Like New", Decentralized Energy, http://www.decentralized-energy.com/articles/print/volume-9/issue-2/features/compressor-washing-keeps-gas-turbines-running-like-new.html, Mar. 1, 2008.

Stalder, "Gas Turbine Compressor Washing State of the Art: Field Experiences", Journal of Engineering for Gas Turbines and Power, vol. 123, pp. 363-370, Apr. 2001. (8 pages).

Thermo Scientific, "Orion™ Calcium Electrodes", https://www.thermofisher.com/order/catalog/product/932001 (3 pages).

Notice of Abandonment dated Jul. 2, 2020 for corresponding Taiwan Invention Patent Application No. 108113614.

English translated version of the Notice of Abandonment dated Jul. 2, 2020 for corresponding Taiwan Invention Patent Application No. 108113614.

Office Action dated Dec. 25, 2019 for corresponding Taiwan Patent application No. 10821226090 (13 pages).

Search Report dated Dec. 25, 2019 for corresponding Taiwan Application No. 108113614 (2 pages).

English Translation of Search Report dated Dec. 25, 2019 for corresponding Taiwan Application No. 108113614 (2 pages).

Written Opinion of International Search Report dated Aug. 16, 2019 for corresponding International Application No. PCT/US2019/027799 (7 pages).

International Preliminary Report on Patentability dated Oct. 29, 2020 for corresponding International Application No. PCT/US2019/027799 (9 pages).

* cited by examiner

MACHINE FOAM CLEANING SYSTEM WITH INTEGRATED SENSING

FIELD

The subject matter described herein relates to systems that clean machines.

BACKGROUND

Some machines having intricate internal mechanisms can be cleaned by directing a cleaning fluid into the machines. For example, foam detergent can be inserted into and pass through a turbine engine to remove contaminants from inside the engine. The foam carries contaminants out of the engine, leaving a cleaner engine that may have improved performance and/or increased remaining useful service life relative to prior to the engine cleaning.

Currently, known cleaning systems direct the cleaning fluid into the machines for a designated period of time to ensure that the machines are thoroughly cleaned. For example, foam washes of turbine engines may be performed for at least four hours, regardless of how dirty the machines are prior to the cleaning. This cleaning duration may last an unnecessarily long period of time, thereby keeping the turbine engine out of service for longer. Additionally, longer-than-needed cleanings can waste materials, such as the foam used to clean the turbine engine.

BRIEF DESCRIPTION

In one embodiment, a system includes a pumping device configured to clean an internal structure of a machine by directing a foam detergent into the machine to reduce an amount of one or more contaminants inside the machine. The foam detergent is directed into the machine such that an effluent portion of the foam detergent exits from the machine with at least some of the contaminants. The system also includes one or more sensors configured to measure one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine. The system also includes a controller configured to determine a cleaning time period during which the foam detergent is to be directed into the machine by the pumping device based on the one or more of the turbidity or the concentration that is measured from the effluent portion of the foam detergent. The controller also is configured to direct the pumping device to continue directing the foam detergent into the machine during the cleaning time period, and to direct the pumping device to stop flow of the foam detergent into the machine responsive to expiration of the cleaning time period.

In one embodiment, a method includes cleaning an internal structure of a machine by directing a foam detergent into the machine to reduce an amount of one or more contaminants inside the machine. The foam detergent is directed into the machine such that an effluent portion of the foam detergent exits from the machine with at least some of the contaminants. The method also can include measuring one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine. The method also can include determining a cleaning time period during which the foam detergent is to be directed into the machine based on the one or more of the turbidity, the salinity of the effluent portion of the foam detergent, the amount of total dissolved solids in the effluent portion of the foam detergent, or the concentration that is measured from the effluent portion of the foam detergent. The method also includes continuing to direct the foam detergent into the machine during the cleaning time period, and stopping flow of the foam detergent into the machine responsive to expiration of the cleaning time period.

In one embodiment, a method includes cleaning an internal structure of a machine by directing a foam detergent into the machine to reduce an amount of one or more contaminants inside the machine. The foam detergent is directed into the machine such that an effluent portion of the foam detergent exits from the machine with at least some of the contaminants. The method also includes repeatedly measuring one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine while the foam detergent is directed into the machine. The method also includes determining whether the one or more of the turbidity, the salinity of the effluent portion of the foam detergent, the amount of total dissolved solids in the effluent portion of the foam detergent, or the concentration that is measured is within a designated range of a designated limit. The method includes stopping flow of the foam detergent into the machine responsive to the one or more of the turbidity or the concentration is within the designated range of the designated limit.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
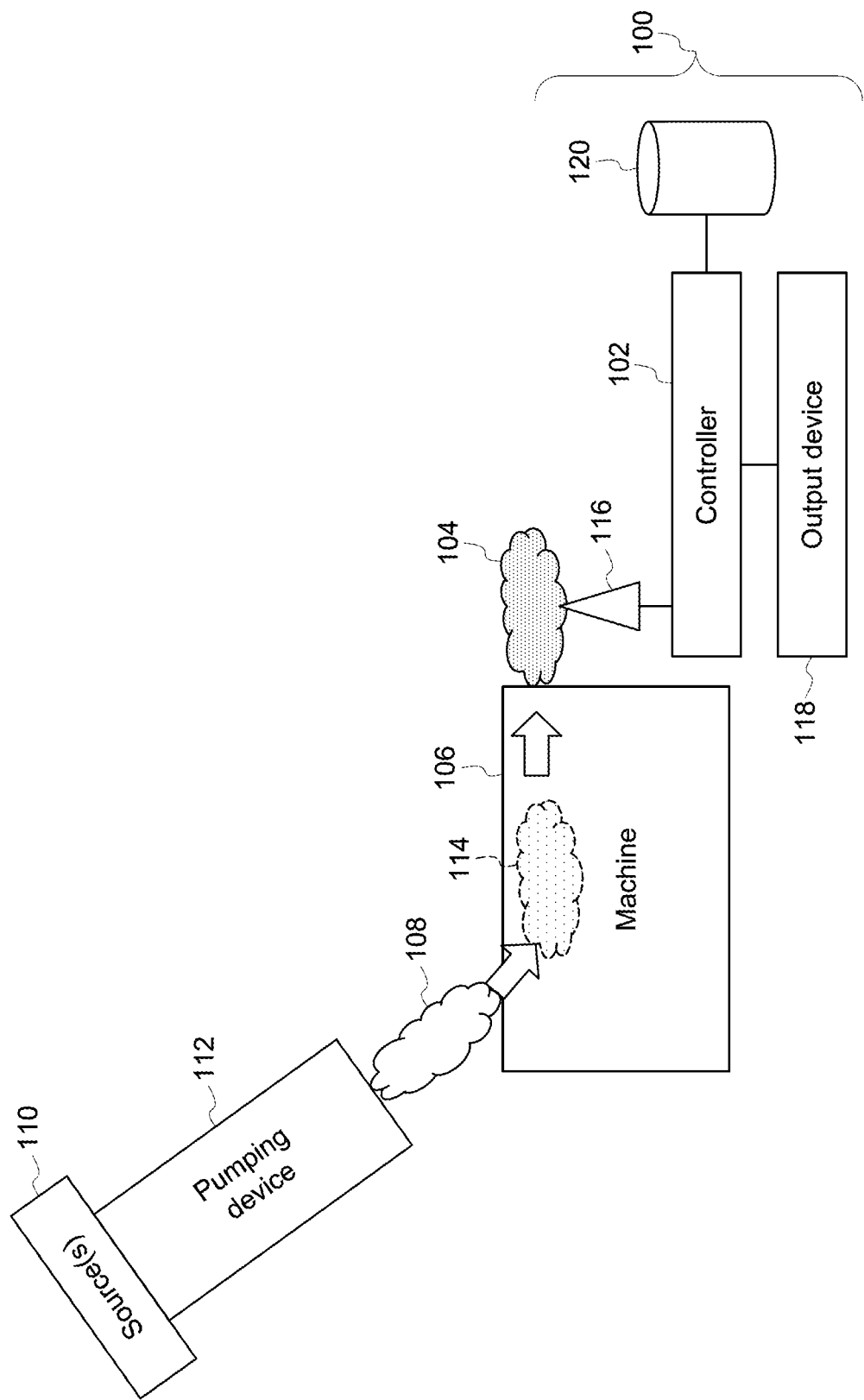
FIG. 1 illustrates a machine foam cleaning system according to one embodiment.

One or more embodiments of the inventive subject matter described herein provide systems and methods that measure characteristics of effluent from a foam detergent-cleaning of a machine to determine how long the foam detergent-cleaning of the machine is to be performed. This effluent can be a liquid phase effluent, or may be effluent in another phase. The characteristics can be a turbidity (e.g., cloudiness) of the effluent, a conductivity of the effluent, a resistivity of the effluent, a salinity of the effluent, a measurement of total dissolved solids (TDS) in the effluent, or a concentration of one or more contaminants in the foam (e.g., removed from the machine during cleaning by the foam). Different measured turbidities of the effluent, different measured conductivities of the effluent, different resistivities of the effluent, and/or different concentrations of the contaminant(s) in the effluent can be associated with different cleaning durations or remaining times until completion of the foam detergent-cleaning process. Depending on the measured characteristics, the system and method may shorten or prolong the cleaning process for the machine. This can reduce the duration of many cleaning processes, which also reduces waste of the foam detergent.

For example, the foam detergent may be pumped into interior chambers of a machine, pick up contaminants from surfaces inside the machine, and exit from the machine via one or more openings or ports as effluent. The effluent can carry contaminants from inside the machine. The system can determine that effluents having larger turbidity values, larger measured conductivities, lower resistivities, greater measured salinities, more total dissolved solids, and/or greater concentrations of contaminants require longer cleaning times relative to effluents having smaller turbidity values, smaller measured conductivities, greater resistivities, smaller salinities, fewer total dissolved solids, and/or smaller concentrations of contaminants. Different values of turbidity values, conductivities, resistivities, salinities, total dissolved solids, and/or contaminant concentrations can be associated with different cleaning times. Shorter cleaning times can result in less foam detergent being used and the machine being cleaned and available for use before longer cleaning times.

At least one embodiment of the inventive subject matter provides a system and method for optimizing the cleaning procedure for foam cleaning of a turbine engine. While the description herein focuses on the foam cleaning of a turbine engine, not all embodiments are limited to the use of foams or the cleaning of a turbine engine. Other cleaning fluids that are not foams can be used, and machines other than turbine engines can be cleaned with the cleaning fluid.

The system and method can predict an exhaust gas temperature (EGT) margin recovery of a turbine engine based on the efficiency of the cleaning of the engine. For example, different changes in the measured characteristic of the effluent and/or different rates of change in the measured characteristic of the effluent can be associated with different changes (e.g., reductions) in the EGT margin of the engine.

During foam cleaning of a turbine engine, contaminants such as dust, dirt, oil, coke, and the like, are removed from individual stages and modules of the engine. Analysis of the effluent detergent as the effluent is discharged from the engine can be performed using sensing probes in an on-line and/or real-time mode (e.g., performed during the cleaning of the engine as additional foam detergent is directed into the engine). The concentrations of analytes such as calcium, sulphur or sulfate, and/or sodium in the effluent can be measured as indicative of the cleaning response of the turbine engine.

During the initial stages of cleaning, the amount of contaminants in the effluent may increase rapidly as the foam detergent selectively dissolves evaporite deposits (sulfates, carbonates, and/or halites), and liberate bound aluminosilicate clays which are accumulated in the turbine engine during service. Once the foam detergent has effectively dissolved these constituents, the analytes that comprise these accumulated evaporite deposits decrease rapidly. After a certain time period, for example 120 minutes, the rate of change of the calcium, sulphur, and/or sodium levels decreases, and the levels then start to reach asymptotes. At these asymptotic points, further cleaning time is considered to have diminishing returns with respect to improvement in the EGT margin and/or with respect to reduction in the fuel flow to the engine (which tends to reduce with cleaner engines).

The system and method can construct an analytic that establishes the asymptote behaviors for various characteristics of the effluent, such as the concentration of contaminants, the turbidity, the conductivity, the salinity, the total dissolved solids, and/or the resistivity of the effluent. These behaviors can be individualized for specific machines (e.g., the asymptotes for different contaminants are different for different engine serial numbers), or can be specified for a class of machines (e.g., the same asymptotes for the same make, same model, and/or same manufacturing date of machines). The correlation between (a) the asymptotes and (b) the increase in EGT margin of the cleaned machine and/or the decrease in fuel flow rate as a result of the foam cleaning also can be individualized for specific machines or specified for a class of machines. Optionally, the system and method (e.g., the controller described below) can use the analytic to create and/or modify maintenance schedules for individual machines or classes of machines, as described herein.

The asymptotes for the effluent characteristics can be established through the course of several foam wash campaigns. For example, the effluent characteristics can be measured for the same machine or a class of several machines repeatedly at different times during each of several foam cleanings of the machine or machines. The relationships between effluent characteristics and cleaning time can be determined from these repeated cleanings and measurements. The relationships can then be used to predict when the effluent characteristic reaches an asymptotic level or value, such as a level or value associated with a designated decrease in the exhaust gas temperature margin of the engine. Several designated decreases in the exhaust gas temperature margin can be measured after different cleanings of the same machine or machines. These measured the exhaust gas temperature margins can be used to associate different asymptotic levels or values with different decreases in exhaust gas temperature margins.

At least one technical effect of the inventive subject matter described herein includes the minimizing or reducing of the time of the foam cleaning procedure and the volume of cleaning fluid used in the cleaning operation, as well as the maximizing or increasing of the exhaust gas temperature margin recovery of the cleaned machine and/or reducing the flow rate of fuel into the engine (e.g., due to the cleaner engine operating more efficiently, thereby requiring less fuel to operate).

In one embodiment, the measured characteristics of the effluent of the foam detergent can be used to create and/or modify a maintenance schedule or cycle of the machine. If the effluent of the detergent is measured to have large amounts of certain contaminants (e.g., sodium, sulfate, etc.), then these amounts of contaminants may indicate that the operations of the machine result in elevated contamination of the machine relative to the operations of other machines. For example, for a turbine engine, higher amounts of sodium or sulfate in the detergent effluent can indicate that the turbine engine is traveling (e.g., propelling an aircraft) between locations having elevated amounts of these contaminants in the atmosphere. This can indicate that this turbine engine should be cleaned more often than other turbine engines that travel between other locations having lower amounts of the contaminants. The maintenance schedule of the turbine engine can accordingly be modified or created to provide for more frequent cleanings. Conversely, lower amounts of sodium or sulfate in the detergent effluent can indicate that the turbine engine is traveling between locations having lesser amounts of these contaminants in the atmosphere. This can indicate that this turbine engine does not need to be cleaned as often as other turbine engines that travel between other locations having greater amounts of the contaminants. The maintenance schedule of the turbine engine can accordingly be modified or created to provide for less frequent cleanings.

FIG. 1 illustrates a machine foam cleaning system 100 according to one embodiment. The system 100 includes a controller 102 that monitors characteristics and/or changes in characteristics of effluent 104 that exits from a machine 106 being cleaned. The controller 102 represents hardware circuitry that includes and/or is connected with one or more processors. The one or more processors can include one or more microprocessors, field programmable gate arrays, integrated circuits, micro controllers, or the like. The controller 102 monitors characteristics of the effluent 104 and determines durations of cleaning processes for the machine 106, as described herein.

The machine 106 can represent a turbine engine or another type of machine. The machine 106 includes intricate internal components that accumulate contaminants, such as calcium, sulfur, sodium, and the like, due to operation of the machine 106. To remove those contaminants, the machine 106 is cleaned by injecting a cleaning foam detergent 108 into interior regions or chambers of the machine 106. This foam detergent 108 is formed from one or more soap detergents in a foam form, such as a combination of a gas and liquid to form the foam detergent 108.

The foam 108 or components used to create the foam 108 can be obtained from one or more container sources 110. For example, one container source 110 may store liquid detergent that is pumped and mixed with air by a pumping device 112. The pumping device 112 includes one or more conduits and/or pumps that pull or push the components used to create the foam detergent 108 from the container sources 110 into the machine 106.

The cleaning foam 108 is injected into the interior chambers of the machine 106 through one or more openings, passages, ports, or the like, in the outer housing of machine 106. As the cleaning foam 108 passes through the machine 106 as cleaning foam 114, the foam 114 picks up, dissolves, or otherwise carries contaminants on surfaces inside the machine 106 out of the machine 106. This foam 114 may exit from the machine 106 via one or more openings, passageways, ports, or the like, as the effluent 104. The effluent 104 may carry or otherwise contain a greater concentration of contaminants than the original cleaning foam 108.

The system 100 includes one or more sensors 116 that measure characteristics of the effluent 104. In one embodiment, the sensor 116 shown in FIG. 1 represents an electrical characteristics sensor that measures an electrical characteristic of the effluent 104. For example, the sensor 116 can include a liquid conductivity system that measures the conductivity of the effluent 104. In one embodiment, increased concentrations of contaminants in the effluent 104 can result in the sensor 116 measuring higher conductivity values of the effluent 104. Conversely, reduced amounts of contaminants in the effluent 104 can result in the sensor 116 measuring smaller conductive values of the effluent 104.

Optionally, the sensor 116 can measure resistivity of the effluent 104. For example, the sensor 116 can represent a multimeter, voltmeter, or the like, that measures how resistive the effluent 104 is to conductance of electric current in the effluent 104. Larger resistivity values of the effluent 104 can indicate smaller concentrations of contaminants in the effluent 104. Conversely, smaller resistivity values indicate larger amounts of contaminants in the effluent 104.

The sensor 116 can include a turbidity sensor or other optical-scattering sensor that measures how optically cloudy or clear the effluent 104 is. The sensor 116 can output a turbidity value, with the value indicative of how cloudy or clear the effluent 104 is. For example, larger turbidity values can indicate cloudier or more opaque effluent 104, while smaller turbidity values can indicate clearer or more translucent foam 104. Larger turbidity values can indicate that the effluent 104 includes greater amounts of contaminants than smaller turbidity values.

Optionally, the sensor 116 can include one or more sensors that measure the concentration of contaminants in the effluent 104. The sensor 116 may represent a single sensor or multiple sensors that directly measure a number of contaminant particles, a mass of contaminant particles, a volume of contaminant particles, or the like, in the effluent 104. For example, an ion selective electrode sensor can be used to measure the amount of one or more contaminants (e.g., sodium, calcium or the like) in the effluent 104. Optionally, the sensor 116 can include one or more sensors that measure the salinity of the effluent 104 and/or the total dissolved solids in the effluent 104.

The cleaning process may begin by the controller 102 directing the pumping device 112 to begin pumping the clean foam 108 into the machine 106. Optionally, the controller can direct operator to begin the pumping device 112 to direct the clean foam 108 into the machine 106, such as by audibly and/or visibly presenting instructions to the operator on an output device or via the output device 118. The output device 118 represent one or more electronic devices that present information to the operator, such as electronic display, a speaker, a touchscreen, or the like.

During the cleaning process, the sensor 116 can measure the characteristic or characteristics of the effluent 104. The sensor 116 can measure the characteristics repeatedly during the cleaning process, such that characteristics are measured as the effluent 104 exits from the machine 106. The measured characteristics can be communicated from the sensor 116 to the controller 102. The controller 102 can save or otherwise record one or more the characteristics provided by the sensor 116 in a tangible and non-transitory computer readable medium, such as a computer memory 120. The computer memory 120 can represent one or more computer hard drives, flash drives, optical discs, or the like.

The controller 102 can examine the characteristic(s) of the effluent 104 and determine a remaining cleaning time based on the characteristic(s). For example, the controller 102 can examine the characteristic that is measured and determine how much longer the cleaning process should continue (with the cleaning process involving clean foam detergent 108 being directed into the machine 106) before the characteristic measured by the sensor 116 reaches or comes within a designated range of an asymptotic limit or value. Responsive to the measured characteristic coming within this asymptotic limit, the controller 102 can automatically direct the pumping device 112 to stop directing additional foam detergent 108 into the machine 106, can automatically present instructions on output device 118 directing an operator to stop operation of the pumping device 112 from directing additional foam detergent 108 in the machine 106, or a combination thereof.

Figure 2:
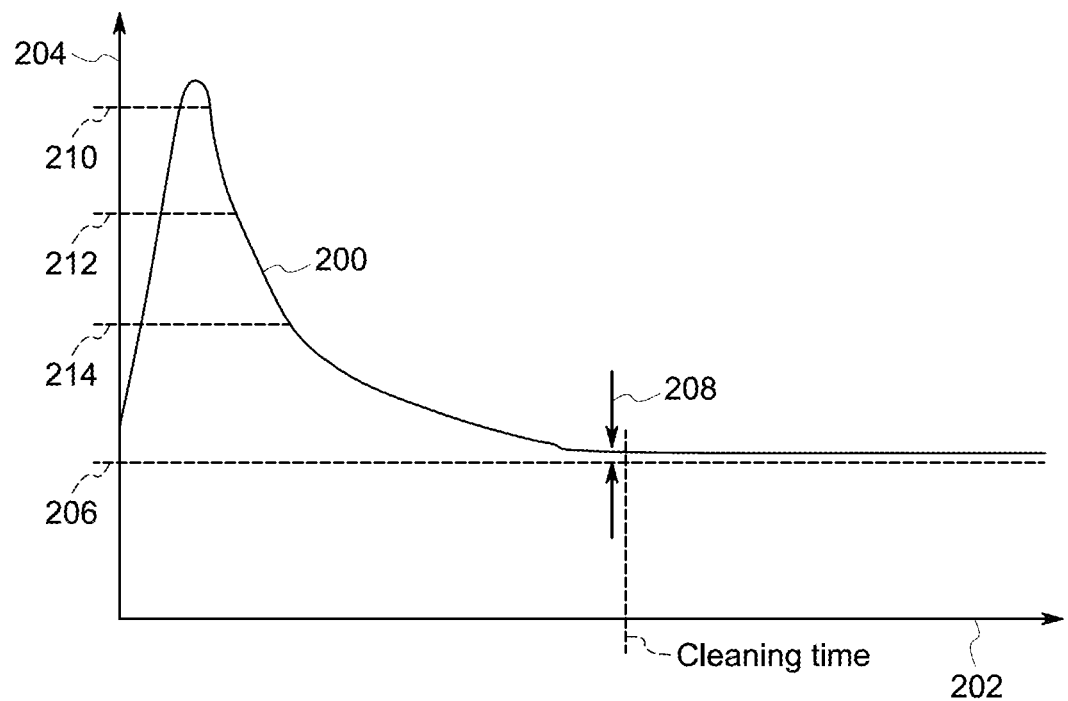
FIG. 2 illustrates one example of a characteristic of effluent that is measured by a sensor shown in FIG. 1.

FIG. 2 illustrates one example of a characteristic 200 of the effluent 104 that is measured by the sensor 116 shown in FIG. 1. The measured characteristic 200 is shown alongside a horizontal axis 202 that represents time and/or number of sample or sample number. The measured characteristic 200 also shown alongside a vertical axis 204 representative of a magnitude of the measured characteristic 200. In the illustrated example, the measured characteristic 200 can represent the conductivity of the effluent 104, the turbidity of the effluent 104, the salinity of the effluent 104, the total dissolved solids in the effluent 104, or an amount of one or more contaminants in the effluent 104.

As shown, the measured characteristic 200 may initially have a relatively low value that rapidly increases. The measured characteristic 200 may then gradually decrease, indicating that passage of the foam 114 through the machine 106 is dissolving, carrying away, or otherwise removing contaminants from inside the machine 106. The measured characteristic 200 may continue to decrease over time and asymptotically approach a limit 206. This limit 206 may be a goal or objective of the cleaning process, such as to reduce the amount of contaminants inside the machine 106 to a level where the characteristic 200 is at or within a designated range 208 of the limit 206. The limit 206 optionally can be referred to as an asymptotic limit. The limit 206 may be determined from previous measurements of the characteristics 200 of a previously used foam detergent 108 in previous cleanings of the same machine 106, of machines 106 in the same class of machines 106, or a combination thereof. For example, the memory 120 can store an average, median, or the like of previously measured characteristics 200 during previous cleanings of the same or similar machines 106 after the machine 106 one machines 106 are determined to be cleaned from contaminants. This average, median, or the like, may be used as the limit 206.

The range 208 may be, for example, a range of 1%, 3%, 5%, or the like, of the limit 206. The characteristic 200 may be within the range to await of asymptotic limit 206 when the value of the characteristic 200 is within 101% of the asymptotic limit 206, within 103% of the asymptotic limit 206, or within 105% of the asymptotic limit 206. In some circumstances, the measured characteristic 200 may not reach levels that are at or below the asymptotic limit 206 even though the cleaning process extends over a long period of time, such as two or more hours. Alternatively, the measured characteristic 200 may eventually reach or fall below the asymptotic limit 206, only after a very long cleaning time, such as two or three hours or more.

The controller 102 may use the measured characteristic 200 in a variety of ways to determine how long the cleaning process of the machine 106 should last. For example, the controller 102 can track changes in the characteristic 200 and stop the cleaning process once the value of the characteristic 200 is at or within range 208 of the limit 206. The sensor 116 can repeatedly measure the characteristic 200 and the controller 102 can repeatedly determine whether the cleaning process should continue based on how close or far the characteristic 200 is from a desired or designated value. In this example, the controller 102 may monitor the value of the measured characteristic 200 as the measured characteristic increases from an initial value toward the peak value shown in FIG. 2. Following this peak value, controller 102 may examine the measured characteristic 200 at a first value 210. At this first value 210, the measured characteristic 200 has a relatively large value, indicating that there still are significant contaminants within the machine 106 and the cleaning process should continue for a longer period of time.

The controller 102 may examine the value of the measured characteristic 200 one or more additional times as the cleaning process continues. This examination of the measured value of the characteristic 200 can be repeated by the controller 102 to determine whether the remaining duration of the cleaning process needs to be updated. For example, depending on the change or rate of change in the value of the measured characteristic 200, the duration of the cleaning process may need to be extended or shortened depending on how effectively the foam 114 is removing contaminants from within the machine 106.

The controller 102 may repeatedly examine the characteristic of the effluent 104 at different times during the cleaning process to determine whether the duration of the cleaning process should be extended to ensure that enough contaminants are removed from the machine 106 or whether the duration of the cleaning process should be stopped to prevent excess use of the foam detergent 108. For example, the controller 102 can later examine the measured characteristic 200 and determine the characteristic 200 has a lower second value 212 and measure the characteristic 200 at an even later time and determine that the characteristic 200 has a lower third value 214.

Responsive to the value of the measured characteristic 200 being at or within the designated range 208 of the limit 206, the controller 102 may determine that the cleaning process is complete. For example, the values the measured characteristic 200 may be at or within the range 208 of limit 206, thereby indicating that the marginal gain in additional cleaning of the machine 106 is insubstantial relative to the cost of directing additional clean foam detergent 108 into the machine 106. As a result, controller 102 may automatically direct the pumping device 112 to stop directing clean foam detergent 108 into the machine 106, may direct the operator to stop the pumping device 112 from directing additional clean foam detergent 108 and the machine 106, or a combination thereof.

As another example of the controller 102 determining how long the cleaning process of the machine 106 should last, the controller 102 may forecast how much longer the cleaning process is to last or be continued based on one or more prior measurements of the characteristic 200. The controller 102 can determine an estimated remaining cleaning time based on the value of the measured characteristic 200 at one or more times. The measured values of the characteristic 200 can be compared with designated values that are associated with the machine 106 or with a class of machines 106. For example, the value 210 of the characteristic 200 may indicate that the cleaning process should continue for an additional sixty minutes, the value 212 may indicate that the cleaning process should continue for an additional forty minutes, and the value 214 may indicate that the cleaning process should continue for an additional thirty minutes.

The designated cleaning times associated with different values of the characteristics 200 can be obtained from the memory 120. The memory 120 can associate different remaining cleaning times with different values of the measured characteristic 200. For example, larger values of effluent conductivity, larger values of contaminant concentration in the effluent, larger values of effluent turbidity, larger salinity values, more total dissolved solids, and/or smaller values of effluent resistivity can be associated with longer cleaning times than smaller values of effluent conductivity, smaller values of contaminant concentration in the effluent, smaller values of effluent turbidity, smaller salinity values, fewer total dissolved solids, and/or larger values of effluent resistivity. The designated cleaning times can be measured or calculated from previous cleanings of the same machine 106 or a class of machines 106.

The controller 102 may repeatedly examine the characteristic of the effluent 104 at different times during the cleaning process to determine whether the duration of the cleaning process should be extended to ensure that enough contaminants are removed from the machine 106 or whether the duration of the cleaning process should be shortened to prevent excess use of the foam detergent 108. The change in the characteristic 200 of the effluent 104 may not change with respect to time as estimated. For example, the controller 102 may first determine that the measured value 210 of the characteristic 200 indicates that the cleaning should continue for an additional sixty minutes from the time at which the value 210 is measured. The controller 102 can later determine that the measured value 212 of the characteristic 200 indicates that the cleaning should continue for an additional forty minutes from the time at which the value 212 is measured. The controller 102 can later determine that the measured value 214 of the characteristic 200 indicates that the cleaning should continue for an additional thirty minutes from the time at which the value 214 is measured.

The controller 102 can update the remaining cleaning time based on the measured values of the characteristic 200. The values of the characteristic 200 may not decrease or increase as expected. For example, the time between when the first and second values 210, 212 of the measured characteristic 200 are measured may not coincide with the difference in remaining cleaning time durations associated with the different values 210, 212. The first value 210 may indicate to the controller 102 that the cleaning process needs continued for an additional sixty minutes. The second value 212 may be measured ten minutes after the first value 210, but may indicate that only forty minutes cleaning time remains (before the characteristic 200 is at or within the range 208 of the limit 206). This can occur because the foam 108, 114 is removing contaminants from the machine 106 more rapidly than expected.

Conversely, the values 210, 212 of the measured characteristic may indicate that the cleaning process is proceeding slower than expected. For example, the second value 212 of the measured characteristic 200 may be obtained forty minutes after the first value 210. This can indicate that, although the values 210, 212 indicate that the cleaning process has continued for twenty minutes (due to the total cleaning process duration being reduced by twenty minutes from the first value 210 second value 212), the contaminants may be removed from the machine 106 by the foam 114 more slowly than expected.

The controller 102 can continue repeatedly examining the values of the characteristic 200 to change, update, or modify the remaining duration of the cleaning process. For example, the controller 102 may measure the characteristic 200 at the third value 214 at a time that is subsequent to when the values 210, 212 are measured. In one example, the value 214 of the measured characteristic may indicate that the cleaning process needs to continue for an additional thirty minutes. The controller 102 can repeatedly examine the characteristic and optionally change the remaining cleaning time that the foam 108 is introduced into the machine 106.

Figure 3:
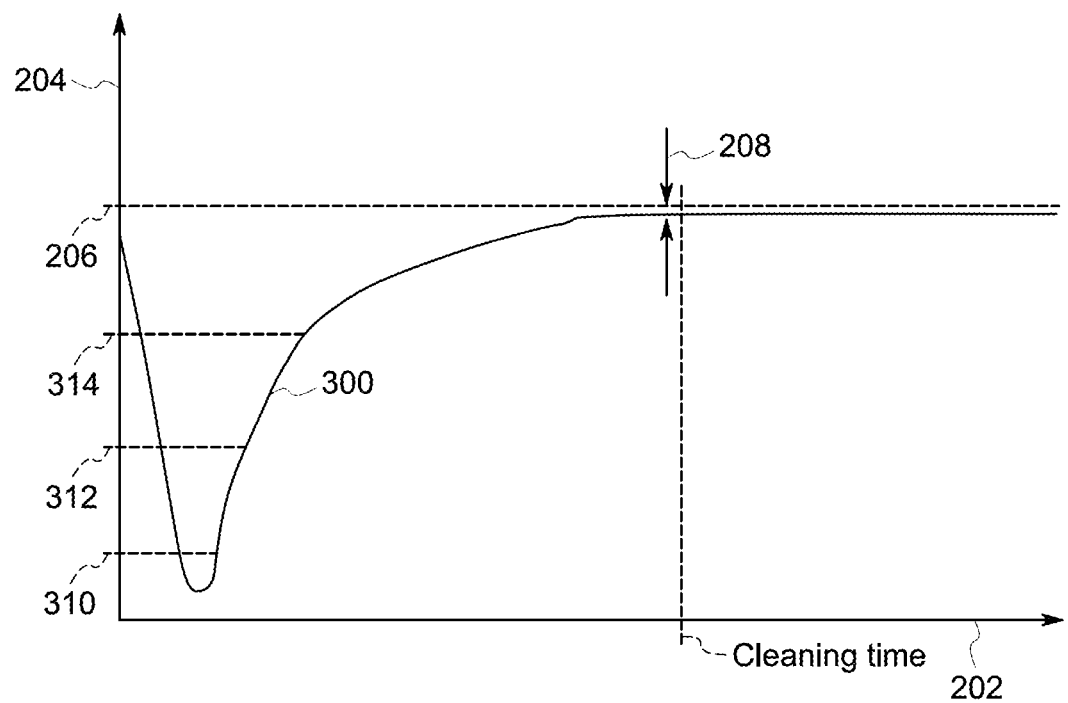
FIG. 3 illustrates one example of a characteristic of the effluent that is measured by the sensor shown in FIG. 1.

FIG. 3 illustrates one example of a characteristic 300 of the effluent 104 that is measured by the sensor 116 shown in FIG. 1. The measured characteristic 300 is shown alongside the horizontal axis 202 and the vertical axis 204 described above. In the illustrated example, the measured characteristic 300 can represent the resistivity of the effluent 104.

The measured characteristic 300 may initially have a relatively large value that rapidly decreases. The measured characteristic 300 may then gradually increase, indicating that passage of the foam 114 through the machine 106 is dissolving, carrying away, or otherwise removing contaminants from inside the machine 106. The measured characteristic 300 may continue to increase over time and asymptotically approach the limit 206.

The controller 102 may use the measured characteristic 300 in a variety of ways to determine how long the cleaning process of the machine 106 should last. For example, the controller 102 can track changes in the characteristic 300 and stop the cleaning process once the value of the characteristic 200 is at or within range 208 of the limit 206. The sensor 116 can repeatedly measure the characteristic 300 and the controller 102 can repeatedly determine whether the cleaning process should continue based on how close or far the characteristic 300 is from a desired or designated value. In this example, the controller 102 may monitor the value of the measured characteristic 300 as the measured characteristic decreases from an initial value toward the smallest value shown in FIG. 3. Following this smallest value, the controller 102 may examine the measured characteristic 300 at a first value 310. At this first value 310, the measured characteristic 300 has a relatively small value, indicating that there still are significant contaminants within the machine 106 and the cleaning process should continue for a longer period of time.

The controller 102 may examine the value of the measured characteristic 300 one or more additional times as the cleaning process continues. This examination of the measured value of the characteristic 300 can be repeated by the controller 102 to determine whether the remaining duration of the cleaning process needs to be updated. For example, depending on the change or rate of change in the value of the measured characteristic 300, the duration of the cleaning process may need to be extended or shortened depending on how effectively the foam 114 is removing contaminants from within the machine 106.

The controller 102 may repeatedly examine the characteristic of the effluent 104 at different times during the cleaning process to determine whether the duration of the cleaning process should be extended to ensure that enough contaminants are removed from the machine 106 or whether the duration of the cleaning process should be stopped to prevent excess use of the foam detergent 108. For example, the controller 102 can later examine the measured characteristic 300 and determine the characteristic 300 has a greater second value 312, and measure the characteristic 300 at an even later time and determine that the characteristic 300 has a greater third value 314. The controller 102 can use these values of the characteristic 300 to determine when to stop the cleaning process and/or to predict when the cleaning process will be complete, as described above.

Figure 4:
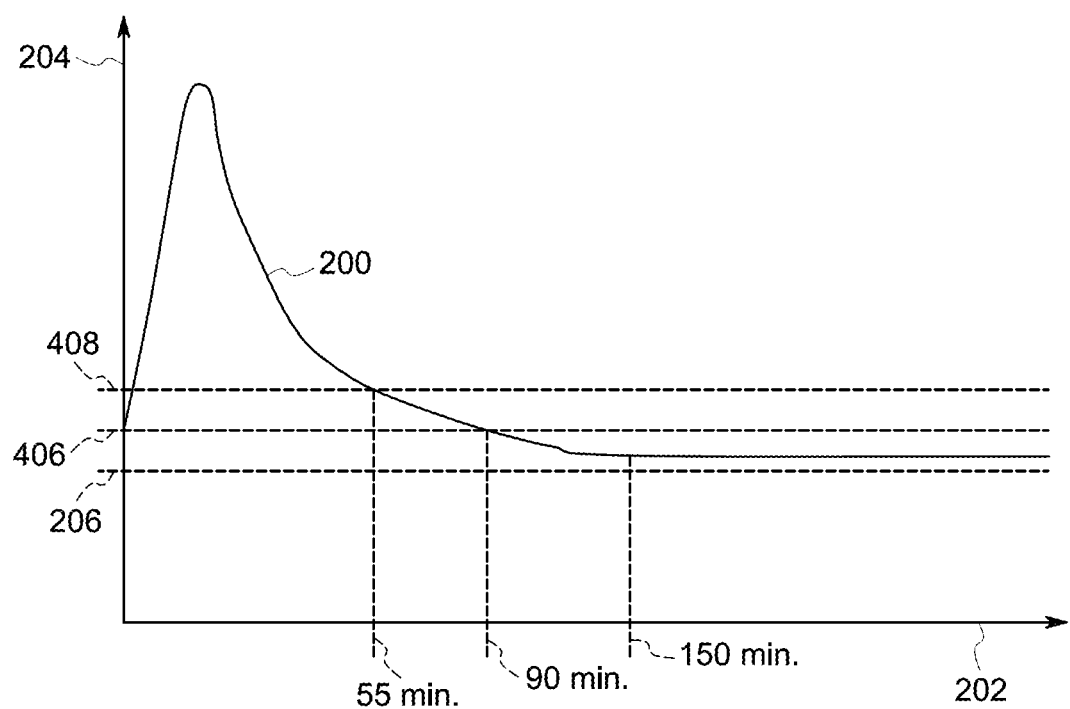
FIG. 4 illustrates another example of how a measured characteristic of the effluent can be used to determine or predict when to end a cleaning process.

FIG. 4 illustrates another example of how a measured characteristic 200 of the effluent 104 can be used to determine or predict when to end a cleaning process. As described above, the values of the measured characteristic 300 may initially increase and then decrease over time with continued direction of the foam detergent 108 into the machine 106. The measured characteristic 300 may decrease over time at a rate that decreases while the measured characteristic 300 approaches an asymptotic limit. For example, the characteristic 300 can continue to decrease with continued cleaning of the machine 106, but the decreases in the characteristic 300 may become smaller over time with additional cleaning of the machine 106.

Optionally, the measured characteristic 300 can initially decrease and then increase over time with continued cleaning. In the illustrated example, there are several different limits 206, 406, 408. These different limits 206, 406, 408 are associated with or representative of different levels of cleanliness of the inside surfaces of the machine 106. For example, the limit 206 is associated with the lowest value of the measured characteristic 200, indicating the cleanest machine 106 relative to the limits 406, 408. Conversely, the limit 408 is associated with the highest value of the measured characteristic 200, indicating that the limit 408 is associated with a dirtier interior of the machine 106, relative to the thresholds or limits 206, 406.

The different thresholds or limits 206, 406, 408 may be associated with different changes in exhaust gas temperature margins of the machine 106. For example, because the limit 206 is associated with a reduced amount of contaminants in the machine 106 relative to the limits 406, 408, the limit 206 may also be associated with a larger decrease in exhaust gas temperature margin of the machine 106. Similarly, the limit 406 may be associated with a decrease in the exhaust gas temperature margin that is not as large of a decrease associated with the limit 206, but is a larger decrease than the decrease associated with the limit 408.

The controller 102 and/or the operator of the system 100 may select the limit 206, 406, 408 based on a desired or selected reduction in the exhaust gas temperature margin of the machine 106. For example, the operator may select the limit 406 as the limit to which the characteristics 200 are to be reduced to determine when to end the cleaning process. The operator may select the limit 406 due to the decrease in exhaust gas margin not being enough to decrease for the limit 408, but with the decrease the exhaust gas temperature margin associated with the limit 206 taking too long to reach.

As another example, the controller 102 may automatically select which limit 206, 406, 408 is used to determine when to terminate the cleaning process. For example, the controller 102 may measure the characteristic 200 at one or more points or times, and determine the approximate or estimate how long the cleaning process must continue for the value of the characteristic 200 to reach each of two or more of the limits 206, 406, 408. The controller may examine these additional cleaning times associated with the different limits 206, 406, 408, and may examine the exhaust gas temperature margin reductions associated with each of the limits 206, 406, 408, and select one of the limits 206, 406, 408 to use in determining when to terminate the cleaning process.

The controller may examine the limit 206 and one or more values of the measured characteristic 200 and determined that it will require an additional cleaning time of one hundred fifty minutes for the characteristic 200 to reach the limit 206 or be within the designated range 208 of the limit 206. The controller may examine the limit 406 and one or more values of the measured characteristic 200 and determine a required additional cleaning time of ninety minutes for the characteristic 200 to reach the limit 406 or be within the designated range 208 of the limit 406. The controller 102 may examine the limit 408 and one or more values of the measured characteristic 200 and determine the required additional cleaning time of fifty-five minutes for the characteristic to reach the limit 408 or be within the designated range 208 of the limit 408.

The controller 102 also can examine the reductions in exhaust gas temperature margins associated with each of the limits 206, 406, 408. As one example, the exhaust gas temperature margin be expected to be reduced by 30% when the characteristic 200 is reduced to or within the range 208 of the limit 206, by 20% with the characteristic 200 is reduced to or within the range 208 of the limit 406, and by 10% with the characteristic 200 reduced to or within the range 208 of the limit 408. Based on these additional cleaning time durations and the corresponding reductions in exhaust gas temperature margins associated with the different limits 206, 406, 408, the controller 102 may select which limit 206, 406, 408 the characteristic 200 is to be reduced to, and also base the remaining cleaning time duration on this selected limit 206, 406 or 408.

In continuing with the preceding example, the controller 102 may select the limit 406 because the limit 406 is associated with the exhaust gas temperature margin reduction that is greater than a desired reduction (for example, at least 15% reduction) and is associated with an additional cleaning process time of ninety minutes, which is less than an upper limit on the cleaning time (for example one hundred twenty minutes). The controller 102 may then direct the pumping device 112 to continue pumping additional clean detergent foam 108 into the machine 106 until this cleaning time duration is reached or until the characteristic 200 is at or within the range 208 of the limit 406.

While the description herein focuses on the controller 102 examining a single characteristic of the effluent 104 to determine how much longer the cleaning process of the machine 106 is to continue, in one embodiment, the controller 102 examines two or more different characteristics of the effluent 104. For example, the controller 102 may obtain measured values of the conductivity and turbidity of the effluent 104. The controller 102 can separately examine these characteristics to determine how much longer the cleaning process of the machine 106 is to continue based on each of the characteristics 200 (e.g., based on how long it is predicted for each characteristic to reach an associated limit or be within the range of the limit). The controller 102 can then combine these cleaning times associated with the different characteristics. For example, the controller 102 can calculate an average or median of the remaining cleaning times associated with the different characteristics of the effluent 104, and use the average or median as the remaining cleaning time used for the machine 106.

Figure 5:
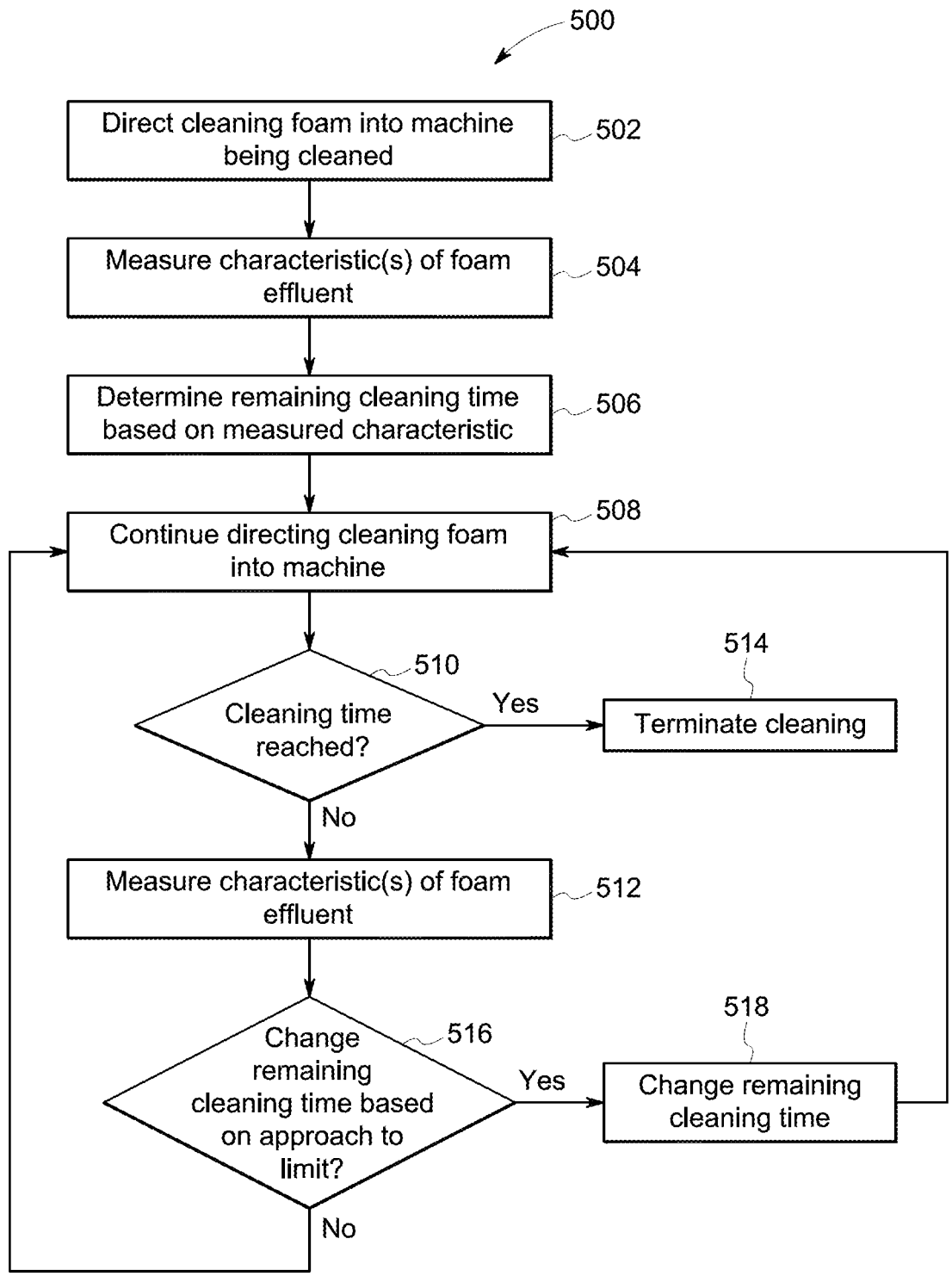
FIG. 5 illustrates a flowchart of one embodiment of a method for foam cleaning of a machine.

FIG. 5 illustrates a flowchart of one embodiment of a method 500 for foam cleaning of a machine. The method 500 can represent the operations performed by the controller 102 in determining and controlling how long the pumping device 112 continues to direct clean foam detergent 108 into the machine 106 to remove contaminants from interior surfaces and chambers of the machine 106.

At 502, clean foam is directed into the machine being cleaned. For example, controller 102 may direct the pumping device 112 to begin directing clean foam detergent 108 into the machine 106, as described above. The foam detergent 108 passes through the machine as the foam 114, and the foam 114 picks up, dissolves, or otherwise carries away contaminants from inside the machine 106. This foam 114 exits the machine 106 as the effluent 104, as described above.

At 504, one or more characteristics of the effluent are measured. As described herein, the sensor 116 can measure the conductivity of the effluent 104, resistivity of the effluent 104, turbidity of the effluent 104, and/or concentration of one or more contaminants in the effluent 104 as a characteristic.

At 506, a remaining cleaning time is determined based on the measured characteristic of the effluent 104. For example, the controller 102 can compare the value of the measured characteristic with the value of a designated limit, and predict how much longer the cleaning process is to continue until the value of the characteristic is expected to be at or within a designated range of the asymptotic limit. Different values of the measured characteristic can be associated with different remaining cleaning times until the characteristic reaches the limit or is within a designated range of the limit based on previous foam cleanings of the same machine or a class of similar machines. As another example, the controller 102 can continue monitoring the values of the characteristic and stop the foam cleaning once the characteristic is at or within the designated range of the designated limit.

At 508, additional cleaning foam is directed into the machine. For example, the pumping device 112 may continue directing clean foam detergent 108 into machine 106. At 510, a determination is made as to whether a remaining cleaning time has been reached. For example, the controller 102 may determine whether the duration of the cleaning process, as determined at 506, has been reached. If additional time remains for the cleaning process to be completed based on the measured value of the characteristic of the effluent that is determined at 506, then flow of the method 500 can proceed toward 512.

But, if the remaining cleaning time as determined at 506 has been reached, then flow of the method 500 can proceed from 510 toward 514. At 514, the cleaning process may be terminated. For example, responsive to determining that the remaining cleaning time determined at 506 has been reached, the controller 102 may automatically direct the pumping device 112 to stop directing additional foam 108 into the machine 106. Operation of the method 500 may then terminate.

Returning to the description of the decision made at 510, if the cleaning time determined at 506 has not yet been reached, then flow of the method 500 can proceed from 510 toward 512. At 512, the characteristic or characteristics of the effluent 104 are measured again. The sensor 116 can measure the characteristic or characteristics of the effluent 104, and communicate these characteristic or characteristics to the controller 102.

At 516, a determination is made as to whether or not the remaining cleaning time needs to be changed based on the measured characteristic. For example, controller 102 may examine the change, rate of change, or other approach of the characteristic of the effluent 104 toward the desired or selected limit. The recently measured characteristic of the effluent 104 may indicate that more or less cleaning time may be needed to reach the designated limit. The controller 102 may determine if additional cleaning time is needed, or if less cleaning time is needed, and may change the remaining cleaning time based on the approach of the characteristic of the effluent 104 to the limit. As a result, flow of the method 500 can proceed from 516 to 518. Alternatively, if the recently measured characteristic of the effluent 104 does not indicate any time needs to be updated, then flow of the method 500 can proceed from 516 toward 508.

At 518, the remaining cleaning time of the machine is updated. If the characteristic measured at 512 indicates that the characteristic is not reducing or increasing at a rate commensurate with the expected change in characteristic during the foam cleaning of the machine 106, the controller 102 may determine that the remaining cleaning time needs to be extended or decreased. For example, if the characteristic measured at 504 indicates that the cleaning process needs to continue for an additional ninety minutes but, thirty minutes later, the characteristic measured at 512 indicates that the cleaning processes should continue for an additional eighty minutes, then the controller 102 may extend the cleaning time.

As another example, if the characteristic measured at 504 indicates of the cleaning processes continue for an additional ninety minutes but, thirty minutes later, the characteristic measured at 512 indicates of the cleaning process needs to continue for an additional forty minutes, the controller may reduce the cleaning time. In this way, this portion of the method 500 can proceed in a loop-wise manner to repeatedly measure characteristics of the effluent 104 to determine and/or update how much longer the cleaning process needs to continue before the characteristic of the effluent 104 is expected to be at or within a designated range of the selected limit.

In one embodiment, the effluent 104 that exits from the machine 106 can be recycled or otherwise re-used as some or all of the foam detergent 108 that is directed into the same machine 106 or another machine 106 at a later time. For example, the effluent 104 can be examined (as described herein) and, depending on the value or values of the characteristic 200, 300 of the effluent 104, at least some of the effluent 104 can be added to the source 110 of foam detergent 108. If the characteristic 200 of the effluent 104 exceeds a designated threshold that is associated with healthy detergent foam 108 (e.g., the threshold 206, 406, and/or 408), then the characteristic 200 may indicate that the effluent 104 is too dirty or cannot otherwise be used as part of the detergent 108 that is introduced into the machine 106. For example, a large value for the characteristic 200 can indicate that the effluent 104 is too dirty to be recycled as detergent foam 108 that is directed into the machine 106 to clean the machine 106. As long as the characteristic 200 of the effluent 104 remains at or below the designated threshold, however, then the effluent 104 may continue to be at least partially recycled as the detergent foam 108 that is directed into the machine 106 to clean the machine 106.

One or more conduits may receive and direct the effluent 104 into one or more filters that clean or otherwise remove contaminants from the effluent 104. The characteristic of the effluent 104 can be measured before and/or after the effluent 104 is cleaned by the filters. A pump (e.g., the pumping device 112 or another pumping device) can direct at least some of the effluent 104 back to the source 110 after the portion of the effluent 104 passes through and is cleaned by the filter(s). The controller 102 can monitor the characteristic of the effluent 104 measured before and/or after the effluent 104 passes through the filter(s) and, depending on the value of the characteristic, the controller 102 can stop the pumping device from directing the effluent 104 back into the source 110.

In one embodiment, the controller 102 can examine the measured characteristics of the effluent 104 of the foam detergent 108 and be used to determine whether to create and/or modify a maintenance schedule or cycle of the machine 106. If the effluent of the detergent is measured to have large amounts of certain contaminants (e.g., sodium, sulfate, etc.), then these amounts of contaminants may indicate that the operations of the machine 106 result in elevated contamination of the machine 106 relative to the operations of other machines. For example, for a turbine engine as the machine 106, higher amounts of sodium or sulfate in the effluent 104 can indicate that the turbine engine is operating in locations having elevated amounts of these contaminants in the atmosphere. This can indicate that this turbine engine should be cleaned more often than other turbine engines that operate in locations having lower amounts of the contaminants. The controller 102 can then create or modify the maintenance schedule of the turbine engine to provide for more frequent cleanings. Conversely, lower amounts of sodium or sulfate in the effluent 104 can indicate that the turbine engine is operating in locations having lesser amounts of these contaminants in the atmosphere. This can indicate that this turbine engine does not need to be cleaned as often as other turbine engines that operate in locations having greater amounts of the contaminants. The controller 102 can then create or modify the maintenance schedule of the turbine engine to provide for less frequent cleanings.

In one embodiment, a system includes a pumping device configured to clean an internal structure of a machine by directing a foam detergent into the machine to reduce an amount of one or more contaminants inside the machine. The foam detergent is directed into the machine such that an effluent portion of the foam detergent exits from the machine with at least some of the contaminants. The system also includes one or more sensors configured to measure one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine. The system also includes a controller configured to determine a cleaning time period during which the foam detergent is to be directed into the machine by the pumping device based on the one or more of the turbidity or the concentration that is measured from the effluent portion of the foam detergent. The controller also is configured to direct the pumping device to continue directing the foam detergent into the machine during the cleaning time period, and to direct the pumping device to stop flow of the foam detergent into the machine responsive to expiration of the cleaning time period.

Optionally, the one or more processors are configured to determine the cleaning time period by estimating how long the foam detergent needs to be directed into the machine before the one or more of the turbidity of the effluent portion of the foam detergent, the salinity of the effluent portion of the foam detergent, the amount of total dissolved solids in the effluent portion of the foam detergent, or the concentration the one or more contaminants in the effluent portion of the foam detergent comes within a designated range of a designated limit.

Optionally, the designated limit is derived from previous measurements of one or more of an electrical characteristic of an effluent portion of a previously used foam detergent in previous machine cleanings, a turbidity of the effluent portion of the previously used foam detergent in the previous machine cleanings, a salinity of the effluent portion of the previously used foam detergent, the amount of total dissolved solids in the effluent portion of the previously used foam detergent, or a concentration of the one or more contaminants in the effluent portion of the previously used foam detergent in the previous machine cleanings.

Optionally, the designated limit is one of several different designated limits each associated with a different change in an exhaust gas temperature margin of the machine.

Optionally, the one or more processors are configured to select the designated limit that is used to determine the cleaning time period based on the different changes in the exhaust gas temperature margins of the machine.

Optionally, the one or more sensors are configured to measure at least two of an electrical characteristic of the effluent portion of the foam detergent, the turbidity of the effluent portion of the foam detergent, the salinity of the effluent portion of the foam detergent, the amount of total dissolved solids in the effluent portion of the foam detergent, or the concentration of the one or more contaminants in the effluent portion of the foam detergent are measured. The controller can be configured to determine the cleaning time period based on the at least two of the electrical characteristic, the turbidity, the salinity, the amount of total dissolved solids, or the concentration of the one or more contaminants.

Optionally, the electrical characteristic includes a conductivity of the effluent portion of the foam detergent.

Optionally, the electrical characteristic includes a resistivity of the effluent portion of the foam detergent.

Optionally, the machine is a turbine engine.

Optionally, at least part of the effluent portion of the foam detergent is recycled back into the machine as the foam detergent. The controller can be configured to monitor the one or more of the turbidity, the salinity, the amount of total dissolved solids, or the concentration the one or more contaminants in the effluent portion of the foam detergent that exits from inside the machine to determine when to stop recycling the at least part of the effluent portion of the foam detergent.

In one embodiment, a method includes cleaning an internal structure of a machine by directing a foam detergent into the machine to reduce an amount of one or more contaminants inside the machine. The foam detergent is directed into the machine such that an effluent portion of the foam detergent exits from the machine with at least some of the contaminants. The method also can include measuring one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine. The method also can include determining a cleaning time period during which the foam detergent is to be directed into the machine based on the one or more of the turbidity, the salinity of the effluent portion of the foam detergent, the amount of total dissolved solids in the effluent portion of the foam detergent, or the concentration that is measured from the effluent portion of the foam detergent. The method also includes continuing to direct the foam detergent into the machine during the cleaning time period, and stopping flow of the foam detergent into the machine responsive to expiration of the cleaning time period.

Optionally, determining the cleaning time period includes estimating how long the foam detergent needs to be directed into the machine before the one or more of the turbidity of the effluent portion of the foam detergent, the salinity of the effluent portion of the foam detergent, the amount of total dissolved solids in the effluent portion of the foam detergent, or the concentration the one or more contaminants in the effluent portion of the foam detergent comes within a designated range of a designated limit.

Optionally, the designated limit is derived from previous measurements of one or more of a turbidity of the effluent portion of the previously used foam detergent in the previous machine cleanings, the salinity of the effluent portion of the previously used foam detergent, the amount of total dissolved solids in the effluent portion of the previously used foam detergent, or a concentration of the one or more contaminants in the effluent portion of the previously used foam detergent in the previous machine cleanings.

Optionally, the designated limit is one of several different designated limits each associated with a different change in an exhaust gas temperature margin of the machine.

Optionally, the method also includes selecting the designated limit used to determine the cleaning time period based on the different changes in the exhaust gas temperature margins of the machine.

Optionally, at least two of an electrical characteristic of the effluent portion of the foam detergent, the turbidity of the effluent portion of the foam detergent, the salinity of the effluent portion of the foam detergent, the amount of total dissolved solids in the effluent portion of the foam detergent, or the concentration of the one or more contaminants in the effluent portion of the foam detergent are measured. The cleaning time period can be determined based on the at least two of the electrical characteristic, the turbidity, the salinity, the amount of total dissolved solids, or the concentration of the one or more contaminants.

Optionally, the electrical characteristic includes a conductivity of the effluent portion of the foam detergent.

Optionally, the electrical characteristic includes a resistivity of the effluent portion of the foam detergent.

In one embodiment, a method includes cleaning an internal structure of a machine by directing a foam detergent into the machine to reduce an amount of one or more contaminants inside the machine. The foam detergent is directed into the machine such that an effluent portion of the foam detergent exits from the machine with at least some of the contaminants. The method also includes repeatedly measuring one or more of a turbidity of the effluent portion of the foam detergent that exits from inside the machine, a salinity of the effluent portion of the foam detergent, an amount of total dissolved solids in the effluent portion of the foam detergent, or a concentration the one or more contaminants in the effluent portion of the foam detergent that exits from inside the machine while the foam detergent is directed into the machine. The method also includes determining whether the one or more of the turbidity, the salinity of the effluent portion of the foam detergent, the amount of total dissolved solids in the effluent portion of the foam detergent, or the concentration that is measured is within a designated range of a designated limit. The method includes stopping flow of the foam detergent into the machine responsive to the one or more of the turbidity or the concentration is within the designated range of the designated limit.

Optionally, the designated limit is one of several different designated limits each associated with a different change in an exhaust gas temperature margin of the machine.

Optionally, the method also includes recycling at least some of the effluent portion of the foam detergent as an additional amount of the foam detergent so long as the one or more of the turbidity or the concentration is below the designated limit.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising: cleaning an internal structure of a turbine engine by directing a foam detergent into the turbine engine to reduce an amount of one or more contaminants inside the turbine engine, the foam detergent directed into the turbine engine such that an effluent portion of the foam detergent exits from the turbine engine via an exit port with at least some of the contaminants; measuring, by a sensor positioned adjacent the exit port of the turbine engine, a salinity of the effluent portion of the foam detergent that exits from inside the turbine engine via the exit port, determining a cleaning time period during which the foam detergent is to be directed into the turbine engine based on the salinity of the effluent portion of the foam detergent; continuing to direct the foam detergent into the turbine engine during the cleaning time period; and stopping flow of the foam detergent into the turbine engine responsive to expiration of the cleaning period, wherein determining the cleaning time period includes estimating how long the foam detergent needs to be directed into the turbine engine before the salinity of the effluent portion of the foam detergent comes within a designated range of a designated limit, and the designated limit is one of several different designated limits each associated with a different change in exhaust gas temperature margin of the turbine engine; and selecting the designated limit used to determine the cleaning time period based on the different changes in the exhaust gas temperature margins of the turbine engine.

2. The method of claim 1, wherein the effluent portion is a first effluent portion and the foam detergent is a first foam detergent, and wherein the designated limit is derived from previous measurements of the salinity of a second effluent portion of a second foam detergent in a previous turbine engine cleaning.

3. The method of claim 1, wherein at least two of an electrical characteristic of the effluent portion of the foam detergent, a turbidity of the effluent portion of the foam detergent, or the salinity of the effluent portion of the foam detergent are measured, and wherein the cleaning time period is determined based on the at least two of the electrical characteristic, the turbidity, or the salinity.

4. The method of claim 3, wherein the electrical characteristic includes a conductivity of the effluent portion of the foam detergent.

5. The method of claim 3, wherein the electrical characteristic includes a resistivity of the effluent portion of the foam detergent.

6. A method comprising: cleaning an internal structure of a turbine engine by directing a foam detergent into the turbine engine to reduce an amount of one or more contaminants inside the turbine engine, the foam detergent directed into the turbine engine such that an effluent portion of the foam detergent exits from the turbine engine via an exit port with at least some of the contaminants; repeatedly measuring, by a sensor positioned adjacent the exit port of the turbine engine, a salinity of the effluent portion of the foam detergent that exits from inside the turbine engine via the exit port while the foam detergent is directed into the turbine engine; determining whether the salinity of the effluent portion of the foam detergent that is measured is within a designated range of a designated limit, determining a cleaning time period during which the foam detergent is to be directed into the turbine engine by estimating how long the foam detergent needs to be directed into the turbine engine before the salinity of the effluent portion of the foam detergent comes within the designated range of the designated limit; and stopping flow of the foam detergent into the turbine engine responsive to the salinity being within the designated range of the designated limit, wherein the designated limit is one of several different designated limits each associated with a different change in an exhaust gas temperature margin of the turbine engine; and selecting the designated limit used to determine the cleaning time period based on the different changes in the exhaust gas temperature margins of the turbine engine.

7. The method of claim 6, further comprising:
recycling at least some of the effluent portion of the foam detergent as an additional amount of the foam detergent so long as the salinity is below the designated limit.

* * * * *